United States Patent
Tang (10) Patent No.: US 8,675,966 B2
(45) Date of Patent: Mar. 18, 2014

(54) SYSTEM AND METHOD FOR SALIENCY MAP GENERATION

(75) Inventor: Hao Tang, Mountain View, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 271 days.

(21) Appl. No.: 13/248,947

(22) Filed: Sep. 29, 2011

(65) Prior Publication Data

US 2013/0084013 A1    Apr. 4, 2013

(51) Int. Cl.
*G06K 9/00*    (2006.01)

(52) U.S. Cl.
USPC ................................................. 382/195

(58) Field of Classification Search
None
See application file for complete search history.

(56) References Cited

U.S. PATENT DOCUMENTS

| | | | |
|---|---|---|---|
| 6,282,317 B1 | 8/2001 | Lou et al. | |
| 8,175,376 B2* | 5/2012 | Marchesotti et al. | 382/159 |
| 8,515,131 B2* | 8/2013 | Koch et al. | 382/103 |
| 2002/0154833 A1* | 10/2002 | Koch et al. | 382/325 |
| 2004/0013305 A1 | 1/2004 | Brandt et al. | |
| 2010/0226564 A1 | 9/2010 | Marchesotti et al. | |
| 2011/0235910 A1* | 9/2011 | Soceanu et al. | 382/173 |
| 2012/0294514 A1* | 11/2012 | Saunders et al. | 382/159 |

FOREIGN PATENT DOCUMENTS

WO    WO-2010109419    9/2010

OTHER PUBLICATIONS

Wu, C. et al. Detecting Large Repetitive Structures with Salient Boundaries, (Research Paper), ECCV'10 Proceedings of the 11th European conference on Computer vision: Part II, 2010, pp. 142-155.

D. Vaqueroa, M. Turka, K. Pullib, M. Ticob, and N. Gelfandb, A survey of image retargeting techniques. In Proc. of SPIE, vol. 7798, p. 14, 2010.

F. Stentiford, An attention based similarity measure with application to content based information retrieval. In Proc. of SPIE, pp. 20-24, 2003.

J. Harel, C. Koch, and P. Perona. Graph-based visual saliency. In Proc. of NIPS.

R. Achanta and S. Susstrunk, Saliency detection for content-aware image resizing, In Proc. of ICIP, pp. 2376-2383, 2010.

S. Goferman, L. Zelnik-Manor, and A. Tal. Context-aware saliency detection. In Proc. of CVPR, pp. 1005-1008, 2009.

Y. Ma and H. Zhang, Contrast-based image attenion analysis by using fuzzy growing, In ACM Multimedia, pp. 374-381, 2003.

D. Vaquaroa, M. Turka, K. Pullib, M. Ticob, and N. Gelfandb, A survey of image retargeting techniques. In Proc. of SPIE, vol. 7798, p. 14, 2010.

(Continued)

*Primary Examiner* — Vikkram Bali (57) ABSTRACT

A system and a method are disclosed for generating a saliency map of an image. The method includes receiving image data representative of image forming elements of an image and determining saliency values for image forming elements by an iterative method. The iterative method includes computing a norm of the image data, computing values of deviation from the norm of the image data of the image forming elements, identifying the image forming elements corresponding to the image data having magnitudes of deviation that meet a predetermined condition, assigning saliency values to the identified image forming elements based on the values of deviation, and repeating the computing the norm and deviation, identifying image forming elements and assigning saliency values using the image data of image forming elements that have no assigned saliency value. A saliency map of the image based on the assigned saliency values.

23 Claims, 8 Drawing Sheets

(56) References Cited

OTHER PUBLICATIONS

F. Stentiford. An attention based similarity measure with application to content based information retrieval. In Proc. of SPIE, pp. 20-24, 2003.

J. Harel, C. Koch, and P. Perona. Graph-based visual saliency. In Proc. of NIPS. *2006*.

L. Itti, C. Koch, and E. Niebur, A model of saliency-based visual attention for rapid scene analysis. PAMI, 20(11):1254-1259, 1998.

P. Acharita and S. Susatrunk, Saliency detection for content-aware image resizing, In Proc. of ICIP, pp. 2376-2383, 2010.

S. Gofermans L. Zelnik-Manor, and A. Tal. Context-aware saliency detection. In Proc. of CVPR. pp. 1005-1008, 2009.

Y, Ma and H. Zhang, Contrast-based image attention analyais by uaing fuzzy growing. In ACM Multimedia, pp. 374-381, 2003.

* cited by examiner

SYSTEM AND METHOD FOR SALIENCY MAP GENERATION

BACKGROUND

With the popularization of consumer digital cameras, image capture is ubiquitous. Billions of images are uploaded to online photo sharing web sites such as FACEBOOK® (social networking service), FLICKR® (computer software), and SNAPFISH® (image processing service). Consumer images can suffer from relatively poor composition compared to professional images. For example, the primary subjects may be too small a part of an image or distractive objects can be allowed to intrude at the edges of the image. It is desirable to infer the likely content of interest in an image to a photographer and make use of image retargeting techniques to enhance this intent. Many image retargeting techniques use saliency maps to infer the content of interest to the photographer. Many multimedia applications involving images may also either rely on or benefit from saliency maps that represent where important areas of images are located. To date, saliency detection techniques for images tend to produce highly blurry saliency maps.

DESCRIPTION OF DRAWINGS

FIGS. 6A-6F show example results of generation of saliency maps of the image of FIG. 4A using an algorithm with different parameter settings.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

A "computer" is any machine, device, or apparatus that processes data according to computer-readable instructions that are stored on a computer-readable medium either temporarily or permanently. A "software application" (also referred to as software, an application, computer software, a computer application, a program, and a computer program) is a set of machine-readable instructions that a computer can interpret and execute to perform one or more specific tasks. A "data file" is a block of information that durably stores data for use by a software application.

The term "computer-readable medium" refers to any medium capable storing information that is readable by a machine (e.g., a computer system). Storage devices suitable for tangibly embodying these instructions and data include, but are not limited to, all forms of non-volatile computer-readable memory, including, for example, semiconductor memory devices, such as EPROM, EEPROM, and Flash memory devices, magnetic disks such as internal hard disks and removable hard disks, magneto-optical disks, DVD-ROM/RAM, and CD-ROM/RAM.

As used herein, the term "includes" means includes but not limited to, the term "including" means including but not limited to. The term "based on" means based at least in part on.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one example, but not necessarily in other examples. The various instances of the phrase "in one embodiment" or similar phrases in various places in the specification are not necessarily all referring to the same embodiment.

Described herein are novel systems and methods for generating a saliency map of an image. The systems and methods implement an effective and efficient saliency detection algorithm for generating saliency maps of images. Systems and methods described herein are capable of detecting salient regions of an image and generating saliency maps with clear boundaries, corresponding to objects in the scene. The systems and methods are robust to background clutter that can be found in images.

A saliency map generated as described herein can be used in image retargeting techniques, and various computer vision and multimedia applications including image segmentation, image retrieval, object detection and recognition, and scene understanding.

Systems and methods herein provide for saliency detection for computing a saliency map that represents where areas of interest in an image are located in a content-aware manner. In a non-limiting example, given an image, the goal is to assign a saliency value in the range 0 to 1 to every pixel of the image, where higher values indicate greater relevance. The relevance is connected with the photographer's intent. There may be no clear definition or measure as of whether a region of an image is relevant. The concept of relevance may be vague and subjective. The images may exhibit vast variability. For example, images taken outdoors can be drastically different from images taken indoors. Crowds and complex scenes are not uncommon.

Existing saliency detection techniques may not provide satisfactory saliency maps. A first example saliency detection technique (S1) builds a multi-resolution pyramid of an image, searches for changes in features (such as color, intensity and orientation), and combines the changes into a saliency map. A second example saliency detection technique (S2) detects image regions that represent the scene of an image based on principles of human visual attention and determines salient regions. Saliency maps generated using the techniques S1 and S2 may be blurry and may not present clear boundaries around objects, therefore it may be difficult to distinguish one salient object from another. For applications such as image segmentation and object detection, it is desirable to have saliency maps with clear object boundaries. A third example saliency detection technique (S3) is based on the global saliency of pixels in an image, obtained by computing the distance from each pixel to the mean pixel of a blurred version of the image in the LAB color space, and uniformly assigning saliency values to entire salient regions. Technique S3 may cause a large part of the background to stand out as salient regions. Technique S3 may be useful if the expected salient objects differ in color from the rest of the image, but a limited number of images may meet this condition.

Figure 1:
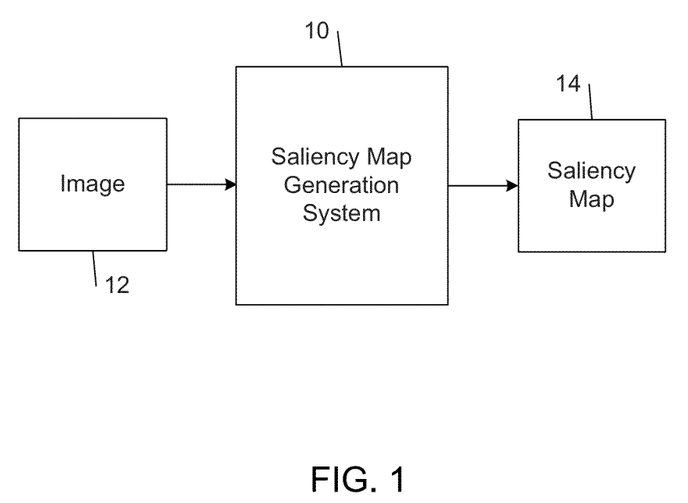
FIG. 1 is a block diagram of an example of a saliency map generation system.

FIG. 1 shows an example of a saliency map generation system 10 that provides a saliency map 14 of an image 12. The saliency map generation system 10 receives image data representative of the image 12, and, according to example methods described herein, determines a saliency map 14 of image 12.

An example source of images 12 is personal photos of a consumer taken of family members and/or friends. Another example source is images captured by an image sensor of, e.g., entertainment or sports celebrities, or reality television individuals. The images can be taken of one or more members of a family near an attraction at an amusement park. In an example use scenario, a system and method disclosed herein is applied to images in a database of images, such as but not limited to images captured using imaging devices (such as but not limited to surveillance devices, or film footage) of an area located at an airport, a stadium, a restaurant, a mall, outside an office building or residence, etc. It will be appreciated that there can be many other image sources.

Figure 2A:
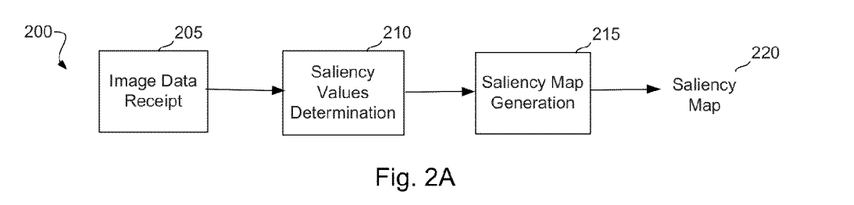
FIG. 2A is a block diagram of an illustrative functionality implemented by an illustrative computerized saliency map generation system.

Referring now to FIG. 2A, a block diagram is shown of an illustrative functionality 200 implemented by saliency map generation system 10 for generating a saliency map of an image, consistent with the principles described herein. Each module in the diagram represents an element of functionality performed by the processing unit 142. Arrows between the modules represent the communication and interoperability among the modules. In brief, image data representative of image forming elements of an image is received in block 205, saliency values for image forming elements of the image are determined in block 210, and a saliency map 220 is generated in block 215.

Referring to block 205, image data representative of image forming elements of an image is received.

An image herein broadly refers to any type of visually perceptible content that may be rendered on a physical medium (e.g., a display monitor or a print medium). Images may be complete or partial versions of any type of digital or electronic image, including: an image that was captured by an image sensor (e.g., a video camera, a still image camera, or an optical scanner) or a processed (e.g., filtered, reformatted, enhanced or otherwise modified) version of such an image; a computer-generated bitmap or vector graphic image; a textual image (e.g., a bitmap image containing text); and an iconographic image.

"Image forming element" refers to an addressable region of an image. In some examples, the image forming elements correspond to pixels, which are the smallest addressable units of an image. In other examples, the image forming elements correspond to superpixels. A superpixel is a grouping of pixels of an image that are locally-connected (for example, pixels having similar image values, a unit color, etc.). Available techniques provide algorithms that can identify grouping of pixels in an image to form the superpixels. In other examples, the image forming elements correspond to image segments, which are groupings of pixels derived from segmentation. The image segments can be determined by segmenting an image into individual segment (such as using clustering), and grouping pixels of the individual segments into the image segments. As a non-limiting example, in an image that includes a grey wall, an image segment can be formed from the pixels of the grey wall in an image.

In examples, the image data can be pixel values associated with the pixels, superpixels or image segments, respectively. Each image forming element has at least one respective "image value" that is represented by one or more bits. For example, an image forming element in the RGB color space includes a respective image value for each of the colors (such as but not limited to red, green, and blue), where each of the image values may be represented by one or more bits. Use of the superpixels or image segments can reduce the number of basic computational units and greatly improve computational efficiency.

In block 210 of FIG. 2A, saliency values for image forming elements are determined by an iterative method using a module. The iterative algorithm provides for the dynamic computation of the norm.

Figure 2B:
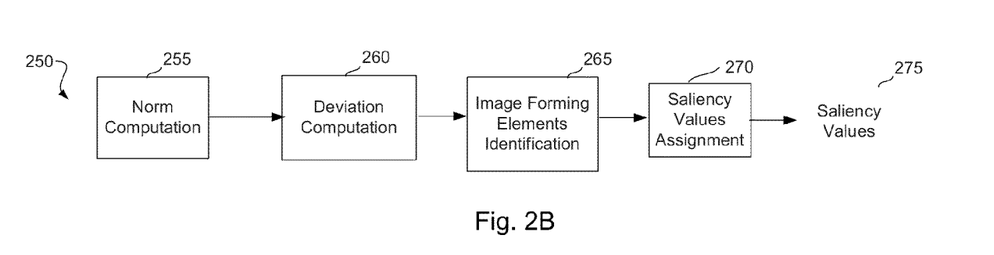
FIG. 2B is a block diagram of an illustrative functionality implemented by an illustrative computerized system for an iterative method for computing a norm and assigning saliency values.

FIG. 2B shows a block diagram of an illustrative functionality 250 implemented by saliency map generation system 10 for saliency values determination using an iterative method, consistent with the principles described herein. Block 255 involves computation of a norm of the image data, hi different examples, the norm can be computed as a mean, a mode or a median of the values of the image data. Block 260 involves computation of values of deviation from the norm of the image data of the image forming elements. As a non-limiting example, the deviation can be computed as a Euclidean distance between the values of the image data and the norm. Block 265 involves image forming element identification and block 270 involves saliency values assignment to the identified image forming elements to provide the saliency values 275. The saliency values 275 assigned to the image forming elements have a value in the range from 0.0 to 1.0. Higher saliency values 275 indicate greater relevance of the image forming element.

In the iterative method, the operations of blocks 255, 260, 265 and 270 are repeated. In each iteration, the image data of image forming elements that have no assigned saliency value are used in the computation. Thus, the iterative method provides for dynamic computation of the norm. In different examples, the iterations can be repeated until about 75%, about 80%, about 90%, or about 95% of the image forming elements have been assigned saliency values; the remaining image forming elements can be assigned a saliency value of about 0.0.

In an example, implementation of block 265 involves identifying image forming elements corresponding to the image data having magnitudes of deviation that meet a pre-determined condition. For example, the pre-determined condition can involve determining image forming elements having magnitudes of deviation above a threshold value that is set such that a fixed number (n) of the image forming elements are identified in block 265. As non-limiting examples, the threshold value is set such that, e.g., the 10, 50, 75, 100 or more image forming elements having the largest values of deviation are identified in each iteration. That is, the image forming elements with the n largest magnitudes of deviation are identified in each iteration. As another example, the pre-determined condition can involve determining image forming elements having magnitudes of deviation above a threshold value such that a fixed percentage of images forming elements are identified in block 265. As non-limiting examples, the threshold value is set such that image forming elements having, e.g., the top 5%, the top 10%, the top 20%, or the top 25%, or more of the magnitudes of deviation are identified in each iteration. In another example, the pre-determined condition is magnitudes of deviation above a threshold value that is defined as a fixed percentage of the maximum value of deviation computed in block 265. Use of the predetermined conditions can reduce the number of basic computational units and greatly improve computational efficiency.

In an example, implementation of block 270 involves assigning saliency values to the identified image forming elements based on the values of deviation. In an example of block 270, the saliency value assigned to each image forming element identified in block 265 in each iteration can be the respective value of deviation computed for the image forming element. In an example of block 270, the saliency value assigned to the image forming elements identified in block 265 in each iteration can be a mean, a mode or a median of the values of deviation computed for the identified image forming elements.

In another example, implementation of block 265 involves identifying the image forming element corresponding to the image data having a highest magnitude of deviation from the norm, and implementation of block 270 involves assigning a saliency value to the identified image forming element based on the respective value of deviation. The saliency value assigned to each image forming element identified in block 265 in each iteration can be the respective value of deviation computed for the image forming element.

In bock 215 of FIG. 2A, saliency map 220 is generated based on the saliency values determined in block 210 using a module.

In an example, the assigned saliency values are normalized to the range [0-1], and the saliency map is generated using the normalized slinky values. In another example, the saliency map of the image can be generated using weighted saliency values. A Gaussian kernel multiplier (such as a Gaussian decay function) can be applied to the saliency values determined in block 210 to provide weighted saliency values. The saliency map can be generated based on the weighted saliency values.

A system and method herein is based on the global contrast of a pixel and uniformly assigns saliency values to entire salient regions rather than just edges or texture regions. Thus, saliency maps can be generated which exhibit clear object boundaries. The described systems and methods herein do not compute a static norm; rather, the norm is dynamically driven toward the true background colors in an iterative manner. Therefore, systems and methods herein are robust to the background clutter commonly found in images, including consumer images.

Figure 3A:
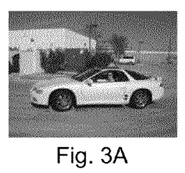
FIGS. 3A-3E show example results of generation of saliency maps based on the image of FIG. 3A.
Figure 3B:
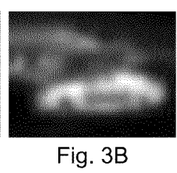
Figure 3C:
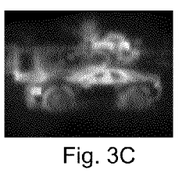
Figure 3D:
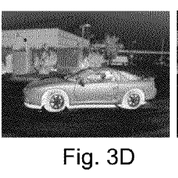
Figure 4A:
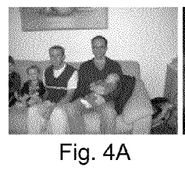
FIGS. 4A-4E show example results of generation of saliency maps based on the image of FIG. 4A.
Figure 4B:
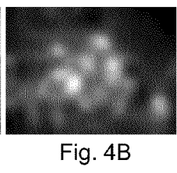
Figure 4C:
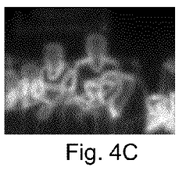
Figure 4D:
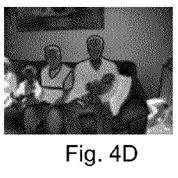
Figure 5A:
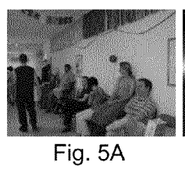
FIGS. 5A-5E show example results of generation of saliency maps based on the image of FIG. 5A.
Figure 5B:
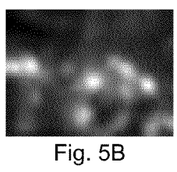
Figure 5C:
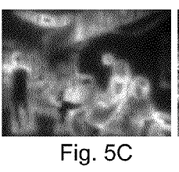
Figure 5D:
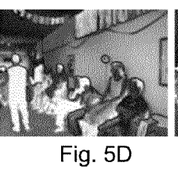

Following is a non-limiting example implementation of the saliency map generation system 10 to generate a saliency map. The example implementation is demonstrated using the images of FIGS. 3A, 4A, and 5A. Pixels are used as the image forming elements in these examples. Initially, the norm is computed as the mean color of the pixels of the entire image. The deviation of a pixel from the norm is computed as the Euclidean distance from this pixel to the mean pixel in the perceptually uniform LAB color space. The pixel with the largest deviation is singled out as the most salient pixel, and is assigned a saliency value equal to the deviation. At the next iteration, this most salient pixel is excluded from the image before the computation described above is repeated. In this way, a most salient pixel is identified at each iteration until the saliency of every pixel in the image is determined. As more and more pixels are identified as salient (i.e., having the largest deviation), the norm is dynamically driven toward the true background colors of the respective image.

Following is a non-limiting example of an algorithm that can be implemented consistent with the principles described herein:

| Algorithm 1: Saliency Detection Algorithm | |
|---|---|
| Input: | Color image A |
| Step 1: | Slightly blur A with a 3 × 3 2D Gaussian filter |
| Step 2: | Convert A from the RGB color space to the perceptually uniform LAB color space |
| Step 3: | Initialize an empty index set K = { } |
| Step 4: | Exclude the pixels indexed by K from A and compute the mean color from A\K |
| Step 5: | Compute the Euclidean distance from the color of every pixel in A\K to the mean color |
| Step 6: | Find the pixel in A\K with the largest distance and suppose its index with respect to A is k |
| Step 7: | Let B(k) = the largest distance and add k to K |
| Step 8: | If the number of elements of K is less than the number of pixels in A, go to Step 4 |
| Step 9: | Normalize the values in B to the [0-1] range |
| Output: | Saliency map B |

Parameters of Algorithm 1 are n (the number of pixels identified and removed in each iteration) and r (the proportion of the total number of pixels in color image A). In an example, in Step 6, instead of finding the pixel in A\K with the largest distance, the procedure can include finding n pixels in A\k with the largest distances and assuming their indices with respect to A are k. In this example, in Step 7, the procedure can include letting B(k)=the respective distances and adding k to K. In an example, saliency map B is initialized with all zero values. In an example, a basic form of Algorithm 1 uses n=1 and r=1 (or 100%). In Step 8, if the number of elements of K reaches a proportion r (e.g., r=0.7 or 70%) of the total number of pixels in color image A, the computation can be terminated. This strategy can reduce the computational time of the basic algorithm, and also further improve the quality of the generated saliency maps by adding more contrast between salient and non-salient pixels.

As observed in many consumer images, the objects of interest are usually placed at or near the image center. A center-biased effect can be introduced to the saliency maps to enhance the contrast of the center-located object of interest. To achieve the center-biased effect, in Step 5, the computed Euclidean distance (deviation) for each pixel is weighted by a Gaussian decay function $G(d)=\exp\{-d/\sigma^2\}$, where d represents the Euclidean distance between the pixel location and the image center (normalized to the [0-1] range) and $\sigma$ is a tunable parameter that controls the decay rate (e.g. $\sigma=0.5$).

Figure 3E:
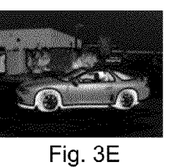
Figure 4E:
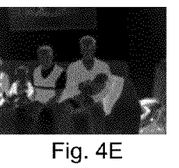
Figure 5E:
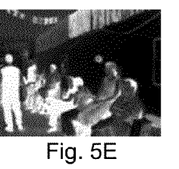

The results of an example implementation of the example algorithm are described. The results are compared to implementations of example saliency detection techniques S1, S2 and S3. FIGS. 3B to 3E show comparisons of the generated saliency maps from an outdoor consumer image using technique S1 (FIG. 3B), technique S2 (FIG. 3C), technique S3 (FIG. 3D), and Algorithm 1 (FIG. 3E). FIGS. 4B to 4E show comparisons of the generated saliency maps from an indoor consumer image using technique S1 (FIG. 4B), technique S2 (FIG. 4C), technique S3 (FIG. 40), and Algorithm 1 (FIG. 4E). FIGS. 5B to 5E show comparisons of the generated saliency maps from another indoor consumer image using technique S1 (FIG. 5B), technique S2 (FIG. 5C), technique S3 (FIG. 5D), and Algorithm 1 (FIG. 5E). In FIGS. 3E, 4E and 5E, Algorithm 1 is implemented with n=100, r=0.7. The comparisons demonstrate that the system and method described herein is capable of detecting salient regions with clear boundaries, corresponding to objects in the scene, and is robust to background clutter commonly found in typical consumer images.

Figure 6A:
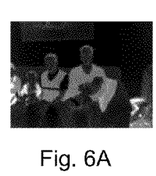
Figure 6B:
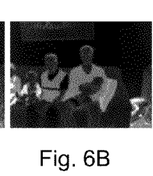
Figure 6C:
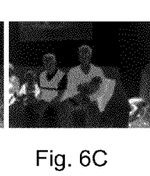
Figure 6E:
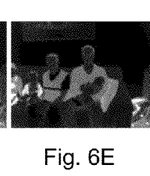
Figure 6F:
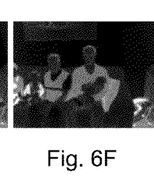
Figure 7A:
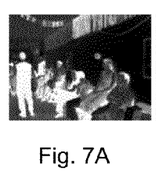
FIGS. 7A-7F show example results of generation of saliency maps of the image of FIG. 5A using an algorithm with different parameter settings.
Figure 7B:
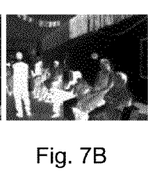
Figure 7C:
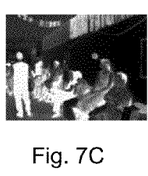
Figure 7D:
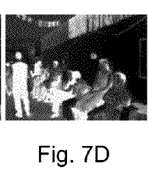
Figure 7E:
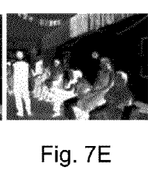
Figure 7F:
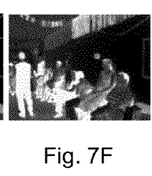

FIGS. 6A to 6F and FIGS. 7A to 7F show example results of generation of saliency maps using a system to implement Algorithm 1 with various settings of n and r. FIGS. 6A to 6F are generated based on the image in FIG. 4A; FIGS. 7A to 7F are generated based on the image in FIG. 5A. The saliency maps of FIG. 6A and 7A are generated using Algorithm 1 with n=1 and r=1. For FIGS. 6B and 7B, n=50 and r=1; for FIGS. 6C and 7C, n=100 and r=1; for FIGS. 6D and 7D, n=1 and r=0.9; for FIGS. 6E and 7E, n=1 and r=0.7; for FIGS. 6F and 7F, n=100 and r=0.7. As shown in FIGS. 6A to 6F and FIGS. 7A to 7F, the saliency maps generated with different settings are visually indistinguishable.

The computational time can be significantly improved, as shown Table 1. The computational run time of algorithms based on each method, based on an implementation in MATLAB® (computer software), over 100 randomly selected consumer images (scaled to the same size of 200 pixels largest dimension) is recorded and averaged. As shown in Table 1, Algorithm 1 is more efficient than technique S2, and is comparable to techniques S1 and S3 for some settings. However, Algorithm 1 provides generated saliency maps with improved quality over techniques S1, S2 and S3.

TABLE 1

Comparison of computational time

| Method | Computational time (s) |
|---|---|
| Technique S1 | 0.47 |
| Technique S2 | 32.96 |
| Technique S3 | 0.063 |
| Algorithm 1 (basic) | 12.74 |
| Algorithm 1 (n = 50) | 0.55 |
| Algorithm 1 (n = 100) | 0.29 |
| Algorithm 1 (r = 0.9) | 11.71 |
| Algorithm 1 (r = 0.7) | 9.12 |
| Algorithm 1 (n = 100, r = 0.7) | 0.24 |

Figure 8A:
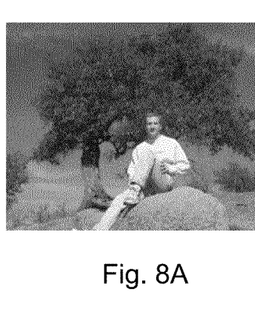
FIGS. 8A-8C show saliency maps (FIGS. 8B and 8C) generated from the image in FIG. 8A.
Figure 8B:
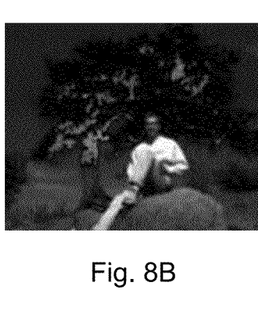
Figure 8C:
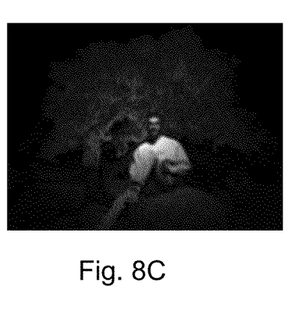

FIGS. 8A to 8C demonstrate use of a center-biased effect. FIGS. 8B and 8C show saliency maps generated from the image in FIG. 8A as described herein with and without the center-biased effect, respectively. In the saliency map of FIG. 8C, the person near the image center stands out and the areas around the image edges are mostly suppressed, as compared to the saliency map of FIG. 8B.

A novel, effective and efficient saliency detection systems and methods are described herein for images, including consumer images. The systems and methods herein are capable of detecting salient regions of an image with clear boundaries, corresponding to objects in the scene. The systems and methods are robust to background clutter that can be found in images. A comparison of a system and method herein with other techniques reveals favorable performance of the system and method in terms of the quality of saliency maps and the computational time.

Figure 9:
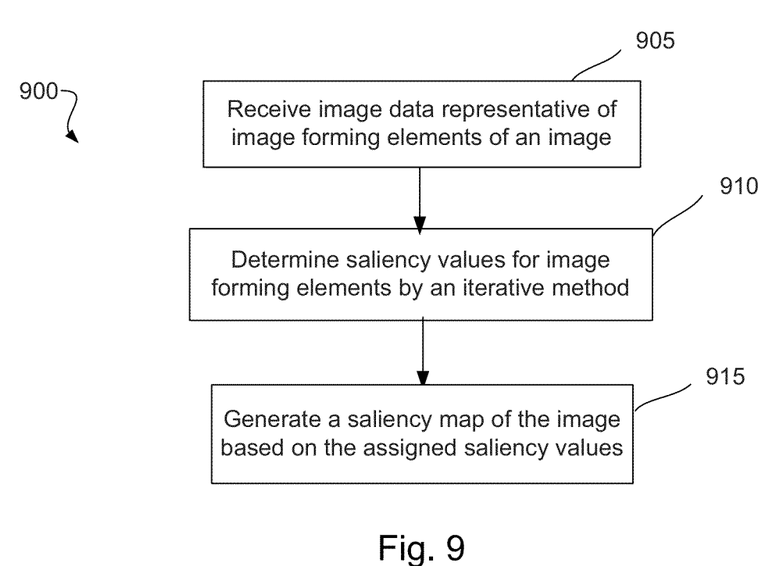
FIG. 9 shows a flow chart of an example process for generating a saliency map of an image.

FIG. 9 shows a flow chart of an example process 900 for generating a saliency map of an image. The processes of FIG. 9 can be performed by modules as described in connection with FIG. 2A. In block 905, image data representative of image forming elements of an image is received. In block 910, saliency values for image forming elements are determined by an iterative method. The iterative method provides for dynamic computation of the norm of the image data. The deviation of the image data from the norm is used to assign saliency values. In block 915, a saliency map of the image is generated based on the assigned saliency values.

Figure 10:
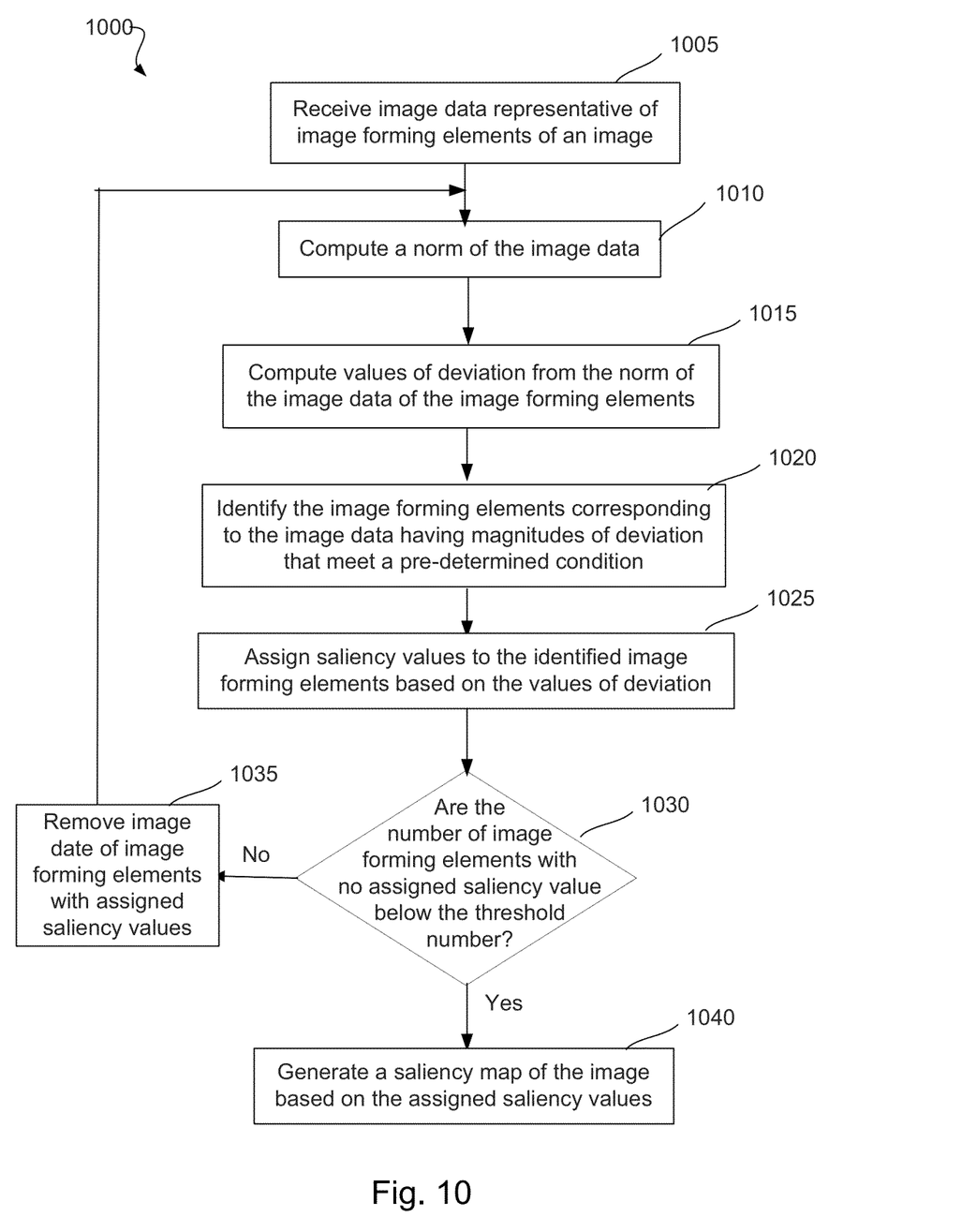
FIG. 10 shows a flow chart of another example process for generating a saliency map of an image.

FIG. 10 shows a flow chart of an example process 1000 for generating a saliency map of an image. The processes of FIG. 10 can be performed by modules as described in connection with FIG. 2A. In block 1005, image data representative of image forming elements of an image is received. The operations of blocks 1010 to 1035 describe the iterative method used for determining saliency values for the image forming elements. In block 1010, a norm of the image data is computed. In block 1015, values of deviation from the norm of the image data of the image forming elements are computed. In block 1020, the image forming elements corresponding to the image data having magnitudes of deviation that meet a predetermined condition are identified. In block 1025, saliency values are assigned to the identified image forming elements based on the values of deviation. In block 1030, it is determined whether the number of image forming elements with no assigned saliency value are below a threshold number. For example, a threshold number can be set such that the iterations are repeated until about 75%, about 80%, about 90%, or about 95% or all of the image forming elements have been assigned saliency values. If the answer is no, then in block 1035, the image data of image forming elements with assigned saliency values are removed and blocks 1010 to 1030 are repeated on the remaining image forming elements. If the answer is yes, then in block 1040, a saliency map of the image is generated based on the assigned saliency values. The remaining image forming elements with no assigned valiancy value from the iterations can be assigned a saliency value of about 0.0.

Figure 11:
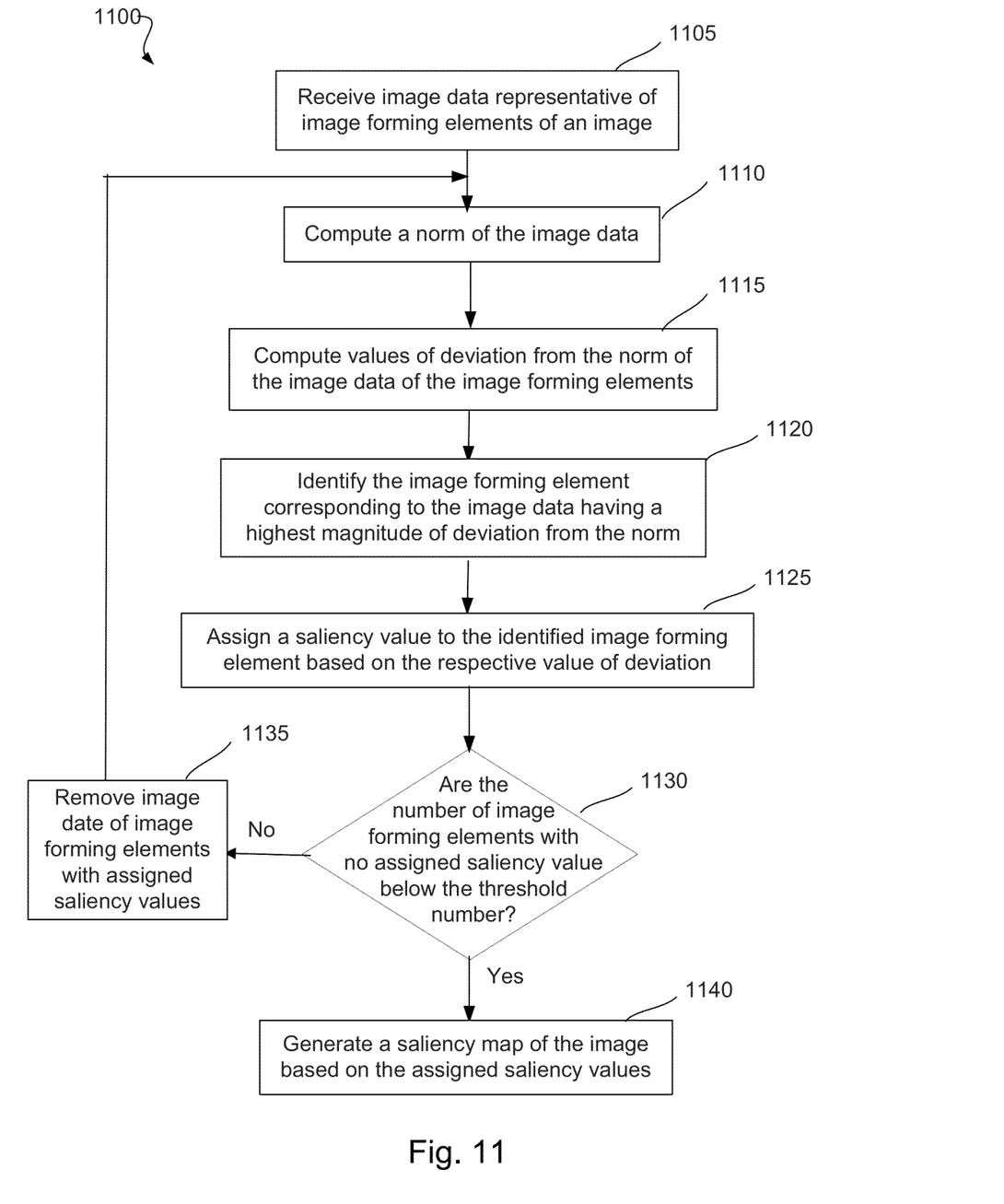
FIG. 11 shows a flow chart of another example process for generating a saliency map of an image.

FIG. 11 shows a flow chart of an example process 1100 for generating a saliency map of an image. The processes of FIG. 11 can be performed by modules as described in connection with FIG. 2A. In block 1105, image data representative of image forming elements of an image is received. The operations of blocks 1110 to 1135 describe the iterative method used for determining saliency values for the image forming elements. In block 1110, a norm of the image data is computed. In block 1115, values of deviation from the norm of the image data of the image forming elements are computed. In block 1120, the image forming element corresponding to the image data having a highest magnitude of deviation from the norm are identified. In block 1125, saliency values are assigned to the identified image forming element based on the respective value of deviation. In block 1130, it is determined whether the number of image forming elements with no assigned saliency value are below a threshold number. For example, a threshold number can be set such that the iterations are repeated until about 75%, about 80%, about 90%, or about 95% or all of the image forming elements have been assigned saliency values. If the answer is no, then in block 1135, the image data of image forming elements with assigned saliency values are removed and blocks 1110 to 1130 are repeated on the remaining image forming elements.

If the answer is yes, then in block 1140, a saliency map of the image is generated based on the assigned saliency values. The remaining image forming elements with no assigned valiancy value from the iterations can be assigned a saliency value of about 0.0.

Figure 12:
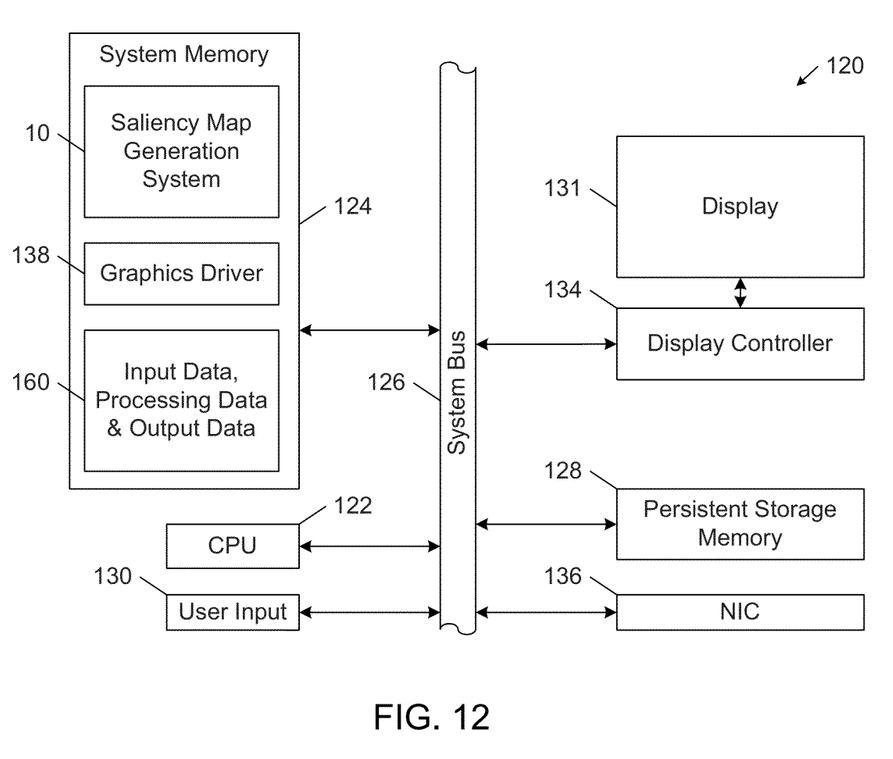
FIG. 12 is a block diagram of an example of a computer system that incorporates an example of the saliency map generation system of FIG. 1.

FIG. 12 shows an example of a computer system 120 that can implement any of the examples of the saliency map generation system 10 that are described herein. Although each element is illustrated as a single component, it should be appreciated that each illustrated component can represent multiple similar components, including multiple components distributed across a cluster of computer systems. The computer system 120 includes a processing unit 122 (CPU), a system memory 124, and a system bus 126 that couples processing unit 122 to the various components of the computer system 120. The processing unit 122 typically includes one or more processors or coprocessors, each of which may be in the form of any one of various commercially available processors. The system memory 124 typically includes a read only memory (ROM) that stores a basic input/output system (BIOS) that contains start-up routines for the computer system 120 and a random access memory (RAM). System memory 124 may be of any memory hierarchy or complexity in the art. The system bus 126 may be a memory bus, a peripheral bus or a local bus, and may be compatible with any of a variety of bus protocols, including PCI, VESA, Microchannel, ISA, and EISA. The illustration shows a single system bus 126, however computer system 120 may include multiple busses. The computer system 120 also includes a persistent storage memory 128 (e.g., a hard drive, a floppy drive, a CD ROM drive, magnetic tape drives, flash memory devices, and digital video disks) that is connected to the system bus 126 and contains one or more computer-readable media disks that provide non-volatile or persistent storage for data, data structures and computer-executable instructions.

A user may interact (e.g., enter commands or data) with the computer system 120 using one or more input devices 130 (e.g., a keyboard, a computer mouse, a microphone, joystick, and touch pad). Information may be presented through a user interface that is displayed to a user on the display 131 (implemented by, e.g., a display monitor), which is controlled by a display controller 134 (implemented by, e.g., a video graphics card). The computer system 120 also typically includes peripheral output devices, such as speakers and a printer. One or more remote computers may be connected to the computer system 120 through a network interface card (NIC) 136.

As shown in FIG. 12, the system memory 124 also stores the saliency map generation system 10, a graphics driver 138, and processing information 160 that includes input data, processing data, and output data. In some examples, the saliency map generation system 10 interfaces with the graphics driver 138 to present a user interface on the display 131 for managing and controlling the operation of the saliency map generation system 10.

The saliency map generation system 10 can include discrete data processing components, each of which may be in the form of any one of various commercially available data processing chips. In some implementations, the saliency map generation system 10 is embedded in the hardware of any one of a wide variety of digital and analog computer devices, including desktop, workstation, and server computers. In some examples, the saliency map generation system 10 executes process instructions (e.g., machine-readable instructions, such as but not limited to computer software and firmware) in the process of implementing the methods that are described herein. These process instructions, as well as the data generated in the course of their execution, are stored in one or more computer-readable media. Storage devices suitable for tangibly embodying these instructions and data include all forms of non-volatile computer-readable memory, including, for example, semiconductor memory devices, such as EPROM, EEPROM, and flash memory devices, magnetic disks such as internal hard disks and removable hard disks, magneto-optical disks, DVD-ROM/RAM, and CD-ROM/RAM.

The principles set forth herein extend equally to any alternative configuration in which saliency map generation system 10 has access to image 12 and other images (including foreground images). As such, alternative examples within the scope of the principles of the present specification include examples in which the saliency map generation system 10 is implemented by the same computer system, examples in which the functionality of the saliency map generation system 10 is implemented by a multiple interconnected computers (e.g., a server in a data center and a user's client machine), examples in which the saliency map generation system 10 communicates with portions of computer system 120 directly through a bus without intermediary network devices, and examples in which the saliency map generation system 10 has a stored local copies of the image 12 and other images (including foreground images).

Many modifications and variations of this invention can be made without departing from its spirit and scope, as will be apparent to those skilled in the art. The specific examples described herein are offered by way of example only, and the invention is to be limited only by the terms of the appended claims, along with the full scope of equivalents to which such claims are entitled.

As an illustration of the wide scope of the systems and methods described herein, the systems and methods described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise.

What is claimed is:

1. A system, comprising:
   a memory storing computer-executable instructions; and
   a processor coupled to the memory, to execute the instructions, and based at least in part on the execution of the instructions, to:
   receive image data representative of image forming elements of an image;
   determine saliency values for image forming elements by an iterative method comprising:
   i) computing a norm of the image data;
   ii) computing values of deviation from the norm of the image data of the image forming elements;

iii) identifying the image forming elements corresponding to the image data having magnitudes of deviation that meet a pre-determined condition;

iv) assigning saliency values to the identified image forming elements based on the values of deviation; and v) repeating (i)-(iv) using the image data of image forming elements that have no assigned saliency value; and generate a saliency map of the image based on the assigned saliency values.

2. The system of claim 1, wherein the image forming elements correspond to pixels, superpixels, or image segments; and wherein the image data are pixel values associated with the pixels, superpixels or image segments, respectively.

3. The system of claim 1, further comprising instructions to compute the norm as a mean, a mode or a median of the values of the image data.

4. The system of claim 1, further comprising instructions to compute the deviation as a Euclidean distance between the values of the image data and the norm.

5. The system of claim 1, wherein, in each iteration, the pre-determined condition is magnitudes of deviation above a threshold value such that a fixed number of the image forming elements are identified in (iii).

6. The system of claim 1, wherein, in each iteration, the pre-determined condition is magnitudes of deviation above a threshold value such that a fixed percentage of images forming elements are identified in (iii).

7. The system of claim 1, wherein, in each iteration, the pre-determined condition is magnitudes of deviation above a threshold value that is defined as a fixed percentage of the maximum value of deviation computed in (ii).

8. The system of claim 1, wherein the saliency value assigned to each image forming element identified in (iii) in each iteration is the respective value of deviation computed for the image forming element.

9. The system of claim 1, wherein the saliency value assigned to the image forming elements identified in (iii) in each iteration is a mean, a mode or a median of the values of deviation computed for the identified image forming elements.

10. The system of claim 1, wherein (i)-(iv) are repeated until about 75%, about 80%, about 90%, or about 95% of the image forming elements have been assigned saliency values.

11. The system of claim 1, wherein the instructions to generate the saliency map of the image further comprises instructions to apply a Gaussian kernel multiplier to the assigned saliency values, and to generate the saliency map of the image based on the weighted saliency values.

12. A system, comprising:
a memory storing computer-executable instructions; and
a processor coupled to the memory, to execute the instructions, and based at least in part on the execution of the instructions, to;
receive image data representative of image forming elements of an image;
determine saliency values for image forming elements by an iterative method comprising:
i) computing a norm of the image data;
ii) computing values of deviation from the norm of the image data of the image forming elements;
iii) identifying the image forming element corresponding to the image data having a highest magnitude of deviation from the norm;
iv) assigning a saliency value to the identified image forming element based on the respective value of deviation; and
v) repeating (i)-(iv) using the image data of image forming elements that have no assigned saliency value; and generate a saliency map of the image based on the assigned saliency values.

13. The system of claim 12, wherein the image forming elements correspond to pixels, superpixels, or image segments; and wherein the image data are pixel values associated with the pixels, superpixels or image segments, respectively.

14. The system of claim 12, further comprising instructions to compute the norm as a mean, a mode or a median of the values of the image data.

15. The system of claim 12, further comprising instructions to compute the deviation as a Euclidean distance between the values of the image data and the norm.

16. The system of claim 12, wherein the saliency value assigned to each image forming element identified in (iii) in each iteration is the respective value of deviation computed for the image forming element.

17. The system of claim 12, wherein the instructions to generate the saliency map of the image further comprises instructions to apply a Gaussian kernel multiplier to the assigned saliency values, and to generate the saliency map of the image based on the weighted saliency values.

18. A method performed by a computing system comprising at least one processor, the method comprising:
receiving, using the at least one processor, image data representative of image forming elements of an image;
determining, using the at least one processor, a saliency value for image forming elements by an iterative method comprising:
i) computing a norm of the image data;
ii) computing values of deviation from the norm of the image data of the image forming elements;
iii) identifying the image forming elements corresponding to the image data having values of deviation that meet a pre-determined condition;
iv) assigning saliency values to the identified image forming elements based on the values of deviation; and
v) repeating (i)-(iv) using the image data of image forming elements that have no assigned saliency value; and
generating, using the at least one processor, a saliency map of the image based on the assigned saliency values.

19. The method of claim 17, wherein the image forming elements correspond to pixels, superpixels, or image segments; and wherein the image data are pixel values associated with the pixels, superpixels or image segments, respectively.

20. The method of claim 17, further comprising computing the norm as a mean, a mode or a median of the values of the image data.

21. The method of claim 17, wherein the saliency value assigned to each image forming element identified in (iii) in each iteration is the respective value of deviation computed for the image forming element.

22. The method of claim 17, wherein, in each iteration, the pre-determined condition is values of deviation above a threshold value such that a fixed number of the image forming elements are identified in (iii).

23. The method of claim 17, wherein, in each iteration, the pre-determined condition is values of deviation above a threshold value such that a fixed percentage of images forming elements are identified in (iii).

* * * * *

UNITED STATES PATENT AND TRADEMARK OFFICE
CERTIFICATE OF CORRECTION

| | | |
|---|---|---|
| PATENT NO. | : 8,675,966 B2 | Page 1 of 1 |
| APPLICATION NO. | : 13/248947 | |
| DATED | : March 18, 2014 | |
| INVENTOR(S) | : Hao Tang | |

It is certified that error appears in the above-identified patent and that said Letters Patent is hereby corrected as shown below:

IN THE CLAIMS

In column 11, line 55, in Claim 12, delete "to;" and insert -- to: --, therefor.

Signed and Sealed this
Twelfth Day of January, 2016

Michelle K. Lee
*Director of the United States Patent and Trademark Office*